(12) United States Patent
Harbers et al.

(10) Patent No.: US 7,534,025 B2
(45) Date of Patent: May 19, 2009

(54) THIN BACKLIGHT WITH FLIPPED LIGHT EMITTING DIODE

(75) Inventors: Gerard Harbers, Sunnyvale, CA (US); Oleg B. Shchekin, San Francisco, CA (US); Serge Bierhuizen, Milpitas, CA (US)

(73) Assignee: Philips Lumiled Lighting Company, LLC, San Jose, CA (US)

( * ) Notice: Subject to any disclaimer, the term of this patent is extended or adjusted under 35 U.S.C. 154(b) by 253 days.

(21) Appl. No.: 11/467,522

(22) Filed: Aug. 25, 2006

(65) Prior Publication Data

US 2008/0049446 A1   Feb. 28, 2008

(51) Int. Cl.
*F21V 7/041* (2006.01)
(52) U.S. Cl. .................. 362/612; 362/26; 362/27; 362/600; 362/601; 362/615
(58) Field of Classification Search ............ 362/612, 362/26, 27, 600, 601, 615; 385/31, 146; 349/65, 68–71
See application file for complete search history.

(56) References Cited

U.S. PATENT DOCUMENTS 7,030,899 B2 *   4/2006   Hoshino et al. ............ 347/236
7,188,988 B2 *   3/2007   Koganezawa ............... 362/616
7,321,161 B2 *   1/2008   Teixeira et al. ............. 257/675

\* cited by examiner

*Primary Examiner*—Sandra L O'Shea
*Assistant Examiner*—Mark Tsidulko
(74) *Attorney, Agent, or Firm*—Patent Law Group; Rachel V. Leiterman

(57) ABSTRACT

One or more LEDs are mounted within an LCD without the use of any printed circuit board (PCB), thus reducing the thickness of the LCD by about the thickness of the conventional PCB. In one embodiment, the LED and submount are mounted so that the submount is opposing the liquid crystal layer side of the LCD, so that the liquid crystal layers provide the mechanical support for the submount and LED die. The LED die (mounted on the submount) may be inserted into a cavity formed in the "top" surface of the light guide, and the top surface of the light guide is abutted against the liquid crystal layers. In such a configuration, the LED light source, including all supporting components, adds no thickness to the LCD. In another embodiment, on the "bottom" surface of the LCD opposing the LED die is an electrically switchable mirror that is either reflective or transparent. In its transparent state, the LED in the LCD may be used as a flash in a cell phone camera, while the LCD may be viewed to take the picture.

19 Claims, 5 Drawing Sheets

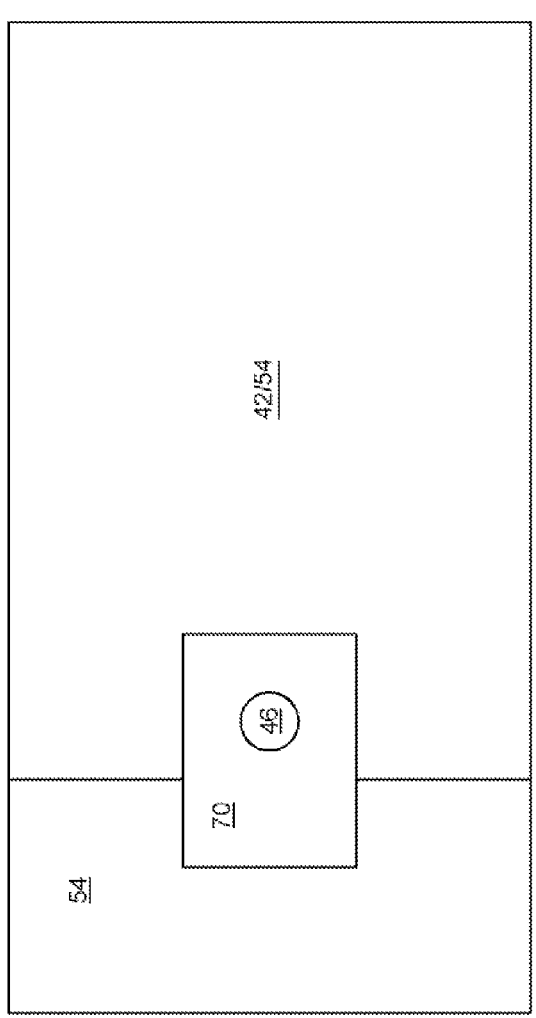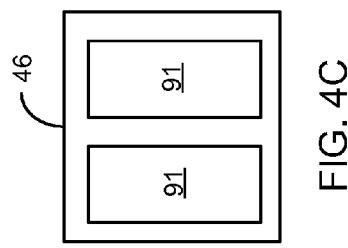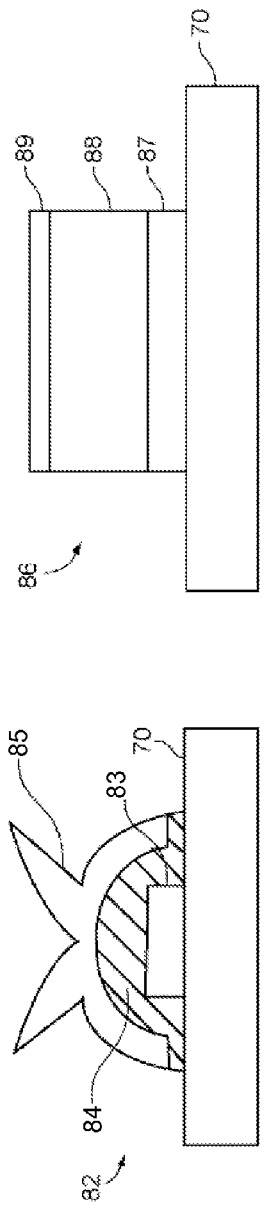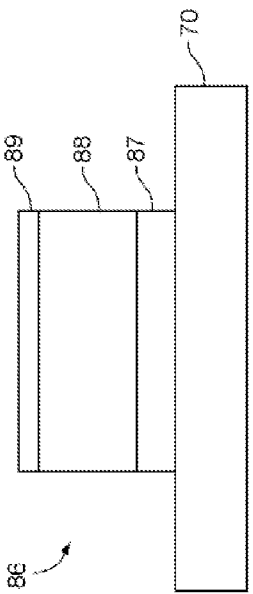

US 7,534,025 B2

THIN BACKLIGHT WITH FLIPPED LIGHT EMITTING DIODE

FIELD OF THE INVENTION

This invention relates to backlights for liquid crystal displays and, in particular, to illuminating the backlight using a light emitting diode (LED).

BACKGROUND

There are many type of backlights used for liquid crystal displays (LCDs). Generally, for full color backlights, the light used to illuminate the backlight has red, green, and blue components. Fluorescent lamps are most commonly used as the light source. With the development of high power LEDs, such LEDs have been replacing the fluorescent lamps in some applications. A combination of red, green, and blue LEDs may be used, or "white light" LEDs may be used. A white light LED uses a blue or UV LED coated with a wavelength-converting phosphor so that the resulting light appears white.

A typical backlight for a small or medium size LCD uses a solid, transparent light guide formed of a polymer. The light source, either a fluorescent bulb or LEDs, is optically coupled to one side edge of the rectangular light guide. The light guide may be in the shape of a wedge or have facets or other types of reflectors that uniformly leak light out of the face of the light guide onto the liquid crystal layers. The red, green, and blue pixel locations of the liquid crystal layers are controlled by electrical signals to effectively act as light shutters for the RGB pixels to create a color image on the LCD screen.

FIG. 1 illustrates a typical LCD using one or more LEDs in the backlight. The light source is an LED module 10. The module 10 comprises an LED die 12 attached to a submount 14, housed in a reflective cavity 16. The cavity has a window 18 that is optically coupled to a side edge of a solid light guide 20. The LED 12 may emit blue light, and a phosphor layer (e.g., YAG:Ce) over the LED leaks some of the blue light and emits yellow-green light, so that the combined light is white. Alternatively, there may be multiple color LEDs to supply red, green, and blue light components to the light guide 20.

Metal pads on the LED die 12 are bonded to corresponding pads on the submount 14. The LED die 12 may be a flip-chip, or the bonds may be by wires. The submount 14 has terminals 22 that connect to a printed circuit board (PCB) 24. The PCB 24 has a conductor pattern connecting the terminals 22 to an LED driver 26.

The LED die 12 and submount 14 may alternatively be located in a cavity formed in the solid light guide 20.

A diffuser 28 and brightness enhancing film (BEF) 30 are located above the light guide 20 to make the light more uniform and brighter within a narrow viewing angle.

Liquid crystal layers 32 are located on the BEF 30 film. An LCD driver 34 controls the electric fields at each RGB pixel location to display an image on the LCD.

A bottom reflective film 36 reflects all light in the light guide upwards toward the liquid crystal layers 32. The light guide 20 may have a wedge shape, be roughened on a surface, have facets, or have other deformities to leak out the light through the top surface.

For a very thin and small LCD, such as suitable for cell phones, personal digital assistants (PDAs), digital cameras, and other small devices, the liquid crystal layers may be as thin as 0.75 mm, the diffuser 28 and BEF 30 may have a combined thickness of 0.25 mm, and the light guide 20 and reflector 36 may have a combined thickness of 0.6 mm, for a total thickness of about 1.6 mm. These thicknesses are believed to be the thinnest currently available.

The total height of the LED module 10 may be made as thin as the light guide/diffuser. The PCB 24 adds significant thickness to the LCD since it provides mechanical support to the LED module 10 and the electrical terminals. The PCB may also serve to remove heat from the submount 14, depending on the power level of the LED. The PCB may be as thick as 1.5 mm.

In very thin devices, it is desirable to further reduce the thickness of LCDs.

SUMMARY

Various embodiments of LCDs are described, where one or more LEDs are mounted within an LCD without the use of any printed circuit board (PCB), thus reducing the thickness of the LCD by about the thickness of the conventional PCB.

In one embodiment, the LED and submount are mounted "upside down" in the LCD so that the submount is opposing the liquid crystal layer side of the LCD. Therefore, the liquid crystal layers provide the mechanical support for the submount and LED die. The LED die (mounted on the submount) may be inserted into a cavity formed in the "top" surface of the light guide, and the top surface of the light guide is abutted against the liquid crystal layers or the optional diffuser and BEF between the light guide and liquid crystal layers. In such a configuration, the LED light source, including all supporting components, adds no thickness to the LCD.

The LED may be a white light LED or may comprise a plurality of LEDs to illuminate the liquid crystal layers with red, green, and blue light components.

In another embodiment, on the "bottom" surface of the LCD opposing the LED die is an electrically switchable mirror that has two states. An electrical signal causes the switchable mirror to be either reflective to reflect back towards the LED all light impinging on the mirror or transparent to let light pass through the switchable mirror. An optional lens, or other collection optics, collimates the light that passes through the switchable mirror, and the collimated light is used as a flash in a cell phone or other device for digital pictures or as a flash light. Suitable driver circuitry is provided to provide a pulse of current through the LED if the LED is to be used as a flash.

Other embodiments are also described.

BRIEF DESCRIPTION OF THE DRAWINGS

FIG. 3 is a top down see-through view of the LCD of FIG. 2 showing the relative locations of the liquid crystal layers, light guide, submount, and LED die.

FIG. 4A is a side cross-sectional view of a possible side-emitting white light LED that may be used in the LCD of FIG. 2.

FIG. 4B is a side cross-sectional view of another possible side-emitting white light LED that may be used in the LCD of FIG. 2.

FIG. 4C is a bottom view of a flip-chip LED die showing bottom electrical terminals.

Elements labeled with the same numerals in the various figures may be the same or equivalent.

DETAILED DESCRIPTION

Figure 2:
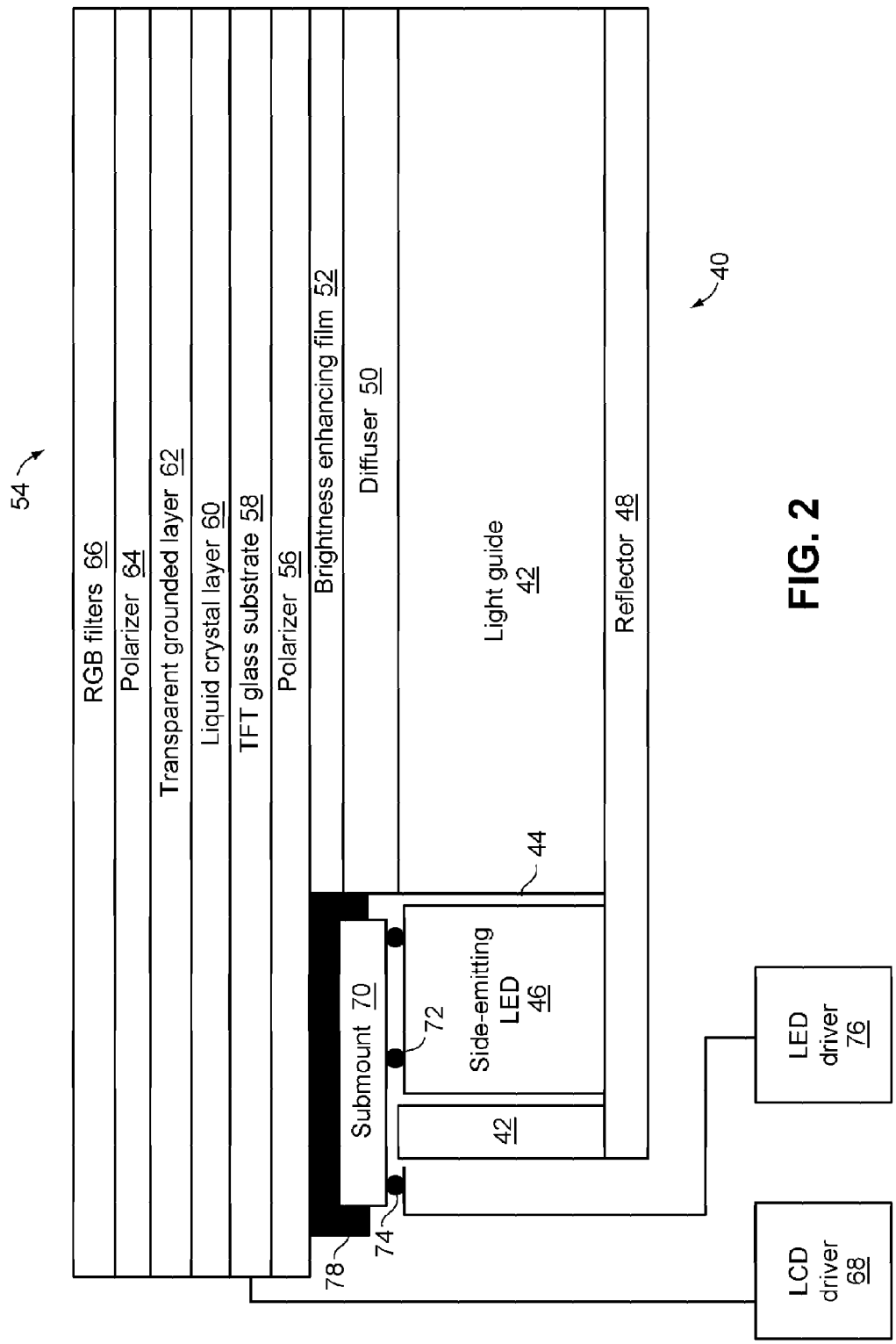
FIG. 2 is a side cross-sectional view of an LCD, where the submount is supported by the liquid crystal layers and/or the light guide so as to obviate the need for a PCB.

FIG. 2 is a side view illustrating an LCD 40 in accordance with one embodiment of the invention. FIG. 3 is a see-through top down view of FIG. 2.

A solid transparent light guide 42, such as formed of a polymer or glass, has a cavity 44 formed in it, where the cavity has the approximate dimensions of a side-emitting LED 46. The side-emitting LED 46 emits most of its light at a low angle 360 degrees around the LED die. Thus, most of the light from the LED 46 is directly transmitted into the light guide 42. An optional reflector may be located around the side walls of the light guide 42 to prevent light escaping from the side walls.

A bottom reflector 48 reflects light in the light guide 42 upward towards the liquid crystal layers. The light guide 42 may have facets, a roughened surface, or other deformities to allow light to leak out the top surface of the light guide 42. The light guide 42 may even be wedge shaped. Many techniques are well known to uniformly leak light out of a light guide.

A diffuser 50, which may be a translucent film, diffuses the light from the light guide 42 to increase the uniformity of light across the surface. A brightness enhancement film (BEF) 52 redirects light into a narrower viewing angle to increase the brightness within that viewing angle. Such BEF films are well known.

The resulting light is then incident upon the back surface of liquid crystal layers 54, which are very well known and need not be described in detail. One type of liquid crystal layers basically consist of a bottom polarizer 56, a transparent thin film transistor (TFT) array 58 on a glass substrate, a liquid crystal layer 60, a transparent ground layer 62 on a glass substrate, an RGB filter 64 corresponding to the RGB pixel locations, and a second polarizer 66. Signals applied by the LCD driver 68 to the TFT array 58 at selected pixel locations change the polarization of light and cause light at that pixel location to be output from the LCD 40 as a red, green, or blue pixel. By proper selection of the TFT signals, color images are produced by the LCD 40.

The LED 46 is mounted on a submount 70. The submount 70 may be formed of a ceramic, silicon, an insulated metal plate, or other suitable material. Metal pads on the LED 46 are bonded to corresponding pads on the submount 70 (solder balls 72 are shown). The LED 46 is preferably a flip-chip to minimize thickness, where a flip chip is a chip with all electrical terminals on the "bottom" surface of the chip for direct bonding to a submount or other mounting structure. The submount 70 has terminals 74 that connect to an LED driver 76. In addition to the submount 70 acting as an electrical interface between the driver 76 and the LED 46, the submount 70 also acts as a heat sink to remove heat from the LED 46. The surface of submount 70 may be reflective to reflect the LED light back towards the light guide 42.

The electrical connection between the submount 70 and the LED driver 76 can be easily realized by so called flex foil interconnects, as for example JTC Flex™, as manufactured by Gould Electronics. As an alternative, the submount 70 and the liquid crystal layers might share the connections on the same flex foil. In case the submount is too small to attach to a flex foil, wirebonding might be used to make the electrical connections to the flex foil, clamped to the side of the submount, or the submount might be placed (glued) in a hole in the flex foil, or the LED 46 might be directly attached on top of a thin flex foil. The electrical connector, such as the flex foil, may additionally serve as a heat sink to remove heat from the LED die.

A metal bracket 78 is connected to both the bottom surface of the liquid crystal layers and the submount 70 to affix the submount 70 in place and to act as an additional heat sink. The metal bracket 78 may also extend beyond the LCD area to provide additional heat sinking, depending on the power usage of the LED. The bracket 78 and submount 70 may be adhesively affixed in place or secured by other suitable means, such as by a thermally conductive tape. In another embodiment, the submount 70 is directly affixed to the liquid crystal layers 54 without the intervening bracket 78. One or more additional layers may be added to the bottom of the liquid crystal layers 54 for supporting the submount 70. The liquid crystal layers and light guide aid in removing heat from the submount 70.

The metal bracket might also be a lead frame, where the metal bracket is split into at least two parts, each part being an electrical connection to provide the anode and cathode voltages to the LED die, as well as providing mechanical support and heat sinking. Either a submount with vias is used, and the submount is soldered to the lead frames, or the LED submount is connected to the lead frame by means of wirebonds.

Figure 1:
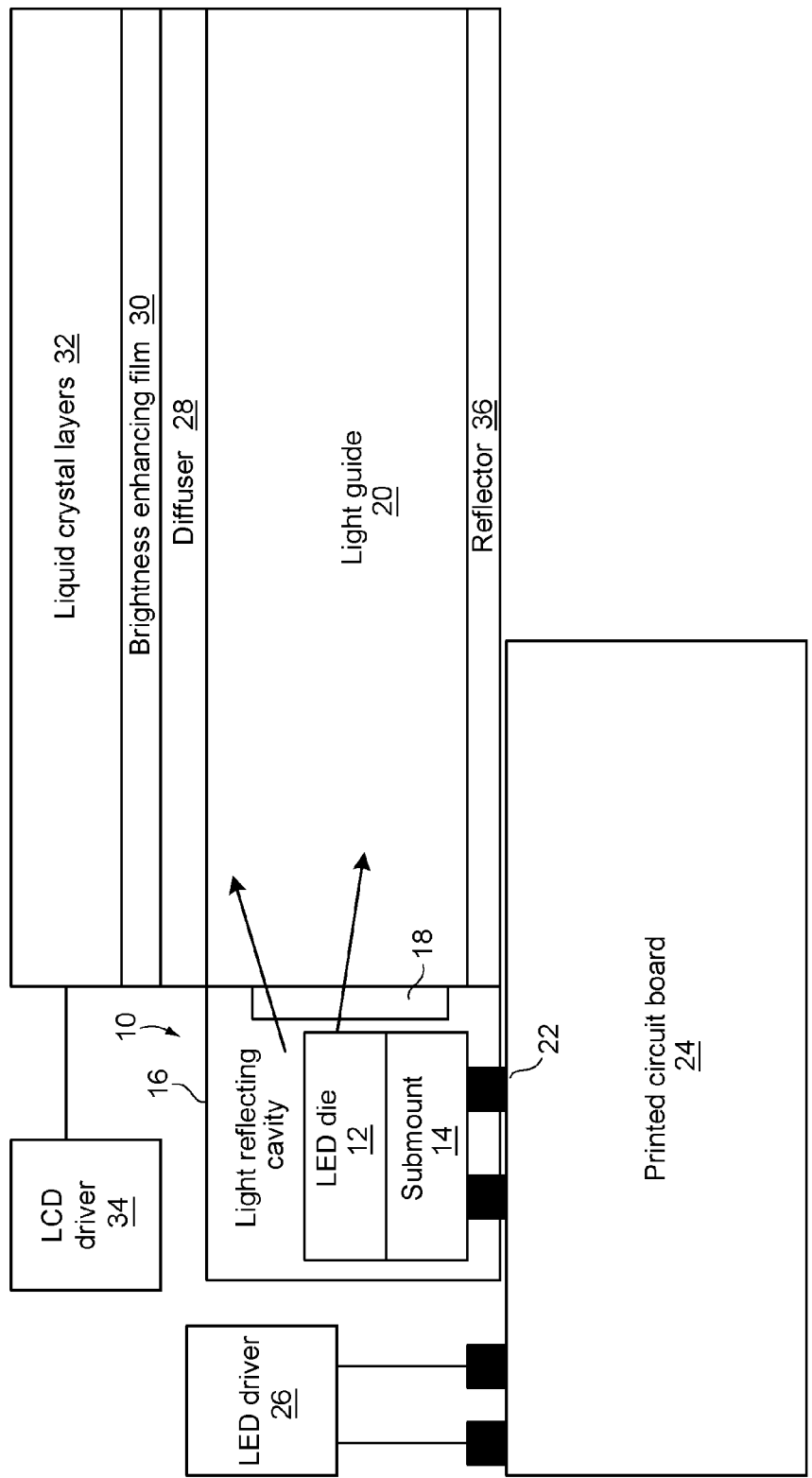
FIG. 1 is a side cross-sectional view of a thin LCD, where the LED module is mounted on a printed circuit board (PCB).

Since the LED 46 and submount 70 do not need any printed circuit board (PCB) for mechanical support, heat sinking, and electrical interfacing, the LCD may be much thinner than the prior art LCD of FIG. 1.

Another benefit of mounting the LED on the liquid crystal layers upside down, is that the distance from the light emitting portion of the LED 46 to the submount 70 is very well defined. By this configuration, the alignment of the submount 70 with the interface of the liquid crystal layers and the light guide is precisely determinable, and the light emitting part of the LED 46 may be precisely aligned with the light guide 42. In the prior art configurations, such as shown in FIG. 1, the position of the light emitting portion of the LED with respect to the light guide is based on the sizes and alignments of various components (e.g., PCB, submount, reflector), and larger alignment errors can occur. Given that alignment precision down to a few microns is relevant for super thin backlights, avoiding such alignment errors is a significant advance.

Any type of LED may be used in the embodiment of FIG. 2, although a side-emitting LED couples light into the light guide 42 with the minimum number of reflections. Multiple LEDs with submounts may be used to couple light into the light guide 42 along one or more sides or the corners of the light guide 42. This may be needed for larger LCDs. Each LED would be supported in the manner shown in FIG. 2.

The thicknesses of the various layers may be the same as described in the Background section of this disclosure, where the resulting thickness of the entire LCD is less than 2 mm.

FIG. 4A is a side cross-sectional view of one type of side-emitting white light LED 82 that may be used in FIG. 2. A blue LED die 83 formed of an AlInGaN material has a phosphor layer 84 deposited or plated over it. The phosphor emits red and green light when energized by the blue LED and leaks some of the blue light. The combined light is white light. Many types of white light LEDs are known and are suitable. A side-emitting lens 85 reflects and refracts the light from the LED die 83 such that a majority of the light is emitted at a low angle around the LED die 83. Alternatively, red, green, and blue LEDs may be used to create the white light, or a white light LED along with a red LED may be used to increase the red component of light. A UV LED with red, green, and blue phosphors may also be used.

FIG. 4B illustrates another embodiment of a side-emitting white light LED 86, which is thinner than the LED of FIG. 4A. LED 86 comprises a blue LED die 87 mounted on a substrate 70, with a phosphor plate 88 attached to the top of the LED die 87. The phosphor composition may be any of the phosphor compositions described herein whose emission combined with blue light creates white light. A top reflector 89 ensures that all light is emitted from the sides of the LED 86.

FIG. 4C is a bottom view of the flip-chip LED die 46 of FIG. 2 showing bottom electrical terminals 91.

Figure 5:
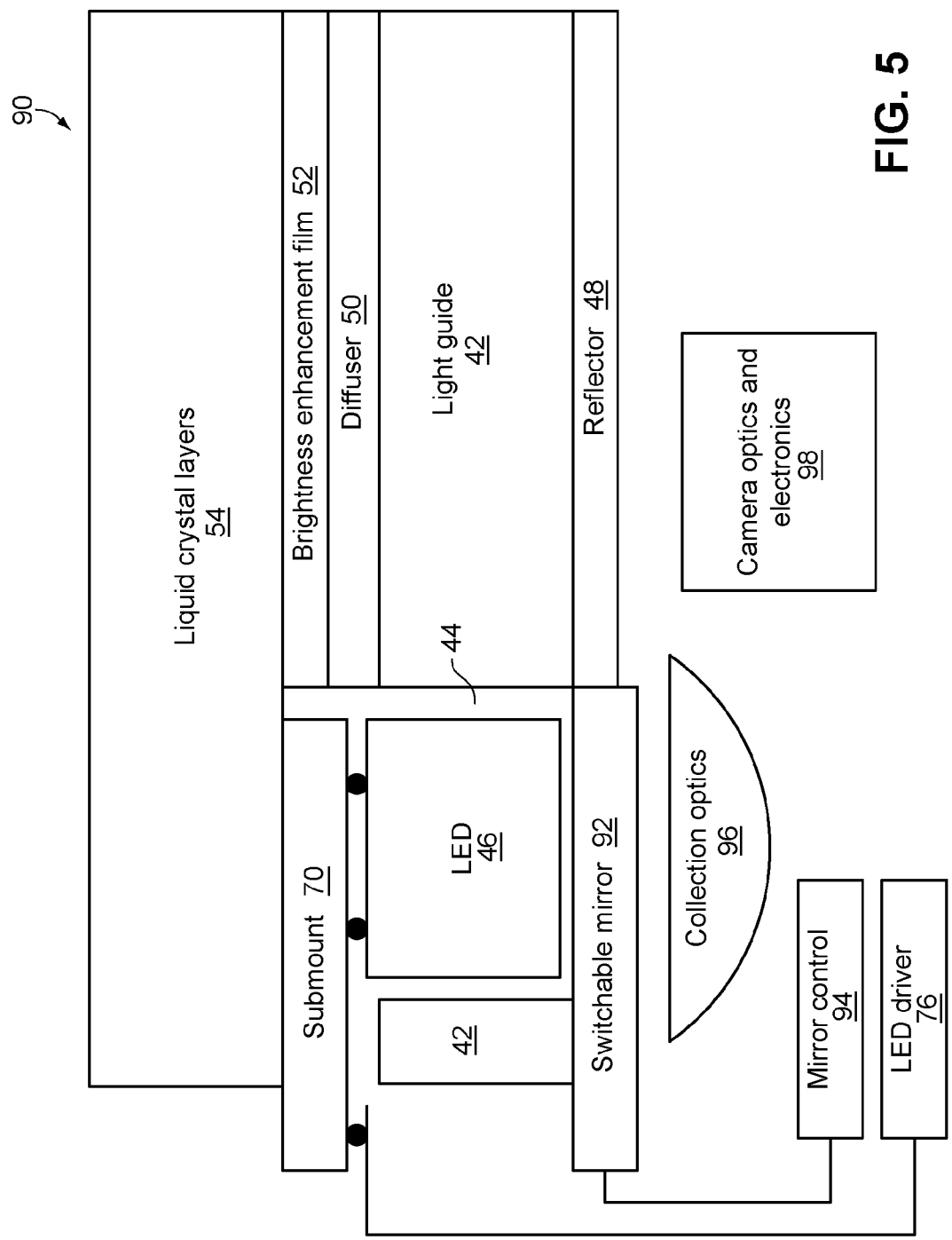
FIG. 5 is a side cross-sectional view of an LCD similar to that of FIG. 2 but with an electrically switchable mirror opposing the LED die, wherein, when the switchable mirror is in a transparent state, the LED may be used as a flash for a cell phone camera.

FIG. 5 is a side cross-sectional view of an LCD 90 that is similar is many ways to the LCD 40 of FIG. 2, and the similarities need not be repeated. In FIG. 5, the submount 70 is directly affixed to the liquid crystal layers 54, but a metal bracket may also be used. In FIG. 5, the reflector 48 at the bottom of the light guide 42 does not extend under the LED 46. Rather an electrically switchable mirror 92 is located beneath the LED. Switchable mirrors are commercially available and are commonly used for optical switching in communications applications. A switchable mirror is reflective in a first state upon application of a first voltage to it by a mirror controller 94 and transparent in a second state upon application of a second voltage applied to it. In FIG. 5, when the switchable mirror 92 is in the first state, the mirror reflects impinging light back into the cavity 44 so it can be coupled into the light guide 42. This mode is used when only the LCD is to be used.

In its second state, the LED 46 may be used as a flash for a digital camera, such as in a cell phone, or a flash light. When the switchable mirror 92 is transparent, the LED light is collimated by the collection optics 96 (a lens) and is used to illuminate a subject for a digital picture. Conventional camera optics and electronics 98 in the cell phone are shown. Typically, the LCD will be used to frame the picture, the user will press the camera button, the switchable mirror 92 will become transparent, an increased pulse of current will be supplied by the driver 76 to the LED 46 to create a bright flash, and the resulting picture will be processed.

Figure 6:
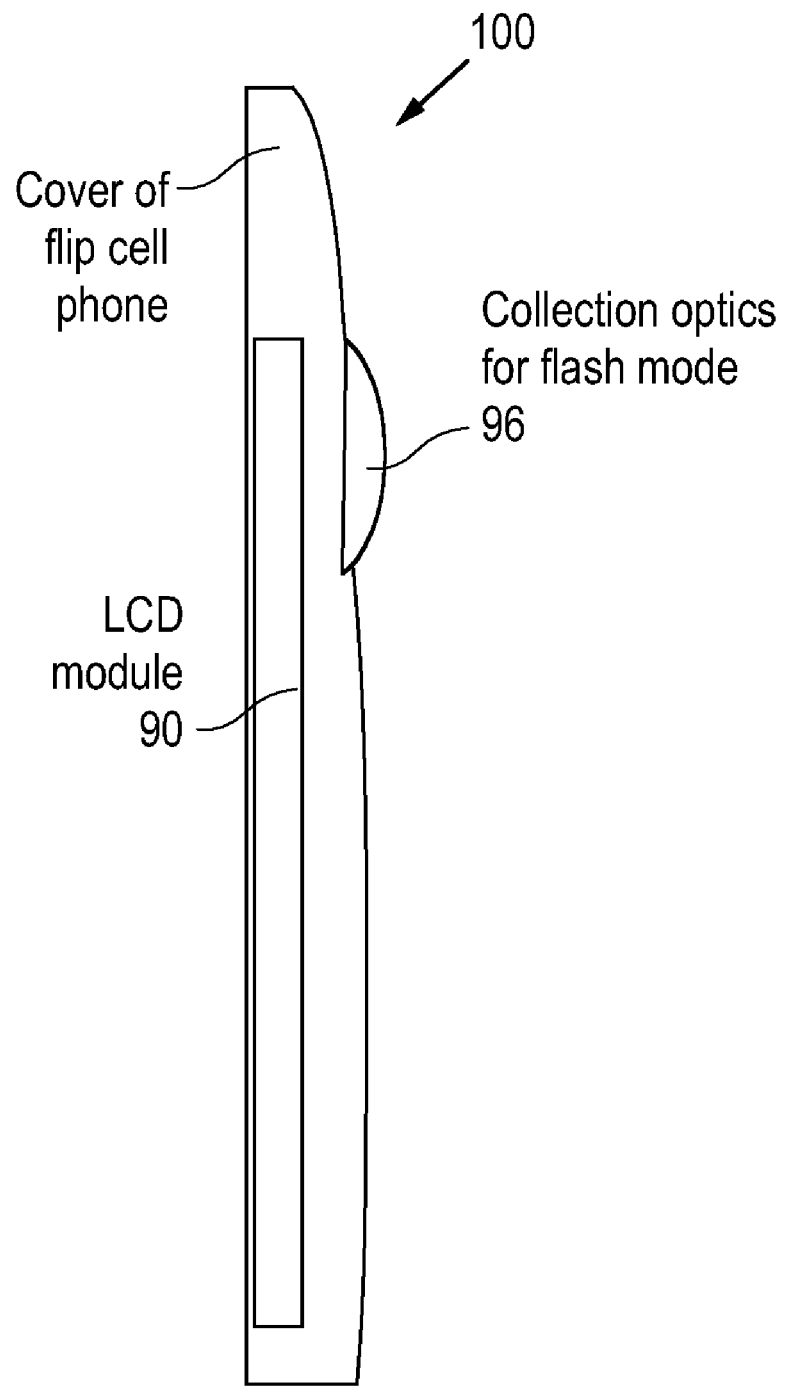
FIG. 6 is a side view of the flip portion of a cell phone showing the LCD and collection optics in FIG. 5.

FIG. 6 is a side view of a flip portion 100 of a cell phone that contains the LCD and flash feature of FIG. 5. Note that the flash and LCD screen are on opposite sides, made possible by the inversion of the LED as compared to the prior art FIG. 1. If it is desirable to be able to have the flash and LCD to be on the same side, such as when the user wishes to take a picture of himself/herself, the flash may be housed in the body of the cell phone, and the LCD may be housed in a flip portion that can be turned.

Any combination of the embodiments is possible. The LCD may be color or monochromatic.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A liquid crystal display (LCD) device comprising:
    a light emitting diode (LED) die being a flip-chip having all electrical terminals on a first surface facing an electrical connector for supplying power to the LED die, the LED die having side surfaces adjacent to the first surface and having a second surface opposing the first surface;
    a substantially rectangular light guide formed of solid material, the light guide having a front surface and a rear surface, light emitted from the LED die being coupled into the light guide; and
    liquid crystal layers over the front surface of the light guide such that light emitted from the front surface of the light guide in a first direction illuminates a rear surface of the liquid crystal layers as a backlight,
    the LED die being mounted in the LCD device proximate the light guide such that the first surface of the LED die faces substantially the first direction, and at least a portion of a light emitting surface of the LED die lies in a plane between the front surface of the light guide and the rear surface of the light guide,
    wherein the liquid crystal layers extend over an edge of the light guide, wherein the LED die is supported by the liquid crystal layers extending over the edge of the light guide.

2. The device of claim 1 wherein the LED die is mounted in a cavity formed in the light guide.

3. The device of claim 1 wherein light is emitted only from the sides of the LED die into the light guide.

4. The device of claim 1 further comprising a reflector facing the second surface of the LED die.

5. The device of claim 1 wherein the electrical connector comprises a submount having electrical terminals bonded to the electrical terminals of the LED die.

6. The device of claim 5 wherein the liquid crystal layers extend over an edge of the light guide, the device further comprising a fixture affixed to a portion of the liquid crystal layers extending over the edge of the light guide, the fixture supporting the submount.

7. The device of claim 5 wherein at least a portion of the submount is in a plane between the front surface of the light guide and the rear surface of the liquid crystal layers.

8. The device of claim 1 further comprising one or more additional flip chip LED dies for coupling light into the light guide, wherein the one or more additional LED dies are mounted in the LCD device proximate to the light guide, a bottom surface of the one or more additional LEDs having electrical terminals, the one or more additional LED dies being mounted such that the bottom surface of the one or more additional LEDs faces substantially the first direction.

9. The device of claim 1 further comprising phosphor proximate to the LED die for color conversion of the light emitted by the LED die, such that white light is generated.

10. The device of claim 1 further comprising a diffuser between the light guide and the liquid crystal layers.

11. The device of claim 1 further comprising a heat sink thermally coupled to the LED die for removing heat from the LED die.

12. The device of claim 1 further comprising a switchable mirror opposing the second surface of the LED die, the switchable mirror being electrically switchable between a first state where a surface of the switchable mirror facing the second surface of the LED die is reflective and a second state where the switchable mirror is substantially transparent.

13. The device of claim 12 further comprising collection optics at a light output side of the switchable mirror for modifying a light pattern of light transmitted by the switchable mirror in the second state.

14. The device of claim 12 further comprising an LED driver for providing a pulse of current to the LED die while the switchable mirror is in the second state for use as a flash in a digital camera.

15. The device of claim 14 further comprising a cellular telephone containing the LCD, the switchable mirror, and a digital camera.

16. The device of claim 1 wherein the LED die is mounted on the LCD without the use of a printed circuit board.

17. The device of claim 1 wherein a total thickness of the LCD is less than about 2 mm.

18. The device of claim 1 wherein the LED die emits blue light.

19. The device of claim 1 further comprising an LED driver electrically coupled to the LED die, via the electrical connector, and an LCD driver electrically coupled to the liquid crystal layers.

* * * * *